United States Patent
Kappelmüller et al.

(10) Patent No.: US 6,793,482 B2
(45) Date of Patent: Sep. 21, 2004

(54) APPARATUS FOR PLASTICIZING AND INJECTING PLASTIC MATERIAL

(75) Inventors: Werner Kappelmüller, Schwertberg (AT); Stefan Eppich, Arbing (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 27 days.

(21) Appl. No.: 10/268,127

(22) Filed: Oct. 10, 2002

(65) Prior Publication Data

US 2003/0072840 A1 Apr. 17, 2003

(30) Foreign Application Priority Data

Oct. 15, 2001 (AT) .......................................... 788/2001 U

(51) Int. Cl.⁷ ............................................. B29C 45/18
(52) U.S. Cl. ................... 425/574; 264/328.11
(58) Field of Search ................. 425/145, 574, 425/589; 264/40.1, 328.11

(56) References Cited

U.S. PATENT DOCUMENTS

| 5,110,283 A | * | 5/1992 | Bluml et al. ................. 425/589 |
| 5,129,808 A | * | 7/1992 | Watanabe et al. ........... 425/145 |
| 5,855,829 A | * | 1/1999 | Siegrist et al. ............. 264/40.1 |

FOREIGN PATENT DOCUMENTS

| DE | 19731833 | 1/1999 |
| JP | 8039633 | 2/1996 |

\* cited by examiner

*Primary Examiner*—Tim Heitbrink
(74) *Attorney, Agent, or Firm*—Notaro&Michalos, PC

(57) ABSTRACT

An apparatus for plasticising and injecting plastic material comprising a rotatable screw (3) arranged in a cylinder (2), wherein the screw (3) is displaced axially by the rotation of spindles (5) which are rotatable by a servomotor (7) moved axially with the screw (3), by way of of gears (27, 27') connected by a toothed belt (17), wherein an intermediate transmission (15) for reducing the rotary speed is arranged between the servomotor (7) and the gears (27, 27').

2 Claims, 5 Drawing Sheets

APPARATUS FOR PLASTICIZING AND INJECTING PLASTIC MATERIAL

DESCRIPTION

The invention relates to an apparatus for plasticising and injecting plastic material comprising a rotatable screw arranged in a cylinder, wherein the screw is displaced axially by the rotation of spindles which are rotatable by a servomotor moved axially with the screw, by means of gears connected by toothed belts.

A known apparatus of that kind (see EP 1 151 843 A1) was apparently logically constructed with the aim that the masses which are moved upon injection of the plastic material are as small as possible and the structure overall is kept as simple as possible. That is achieved in that structure shown in FIGS. 1 to 3, insofar as the drive output pinion of the servomotor is connected by means of a toothed belt directly to a respective gear which sits directly on each of the spindles. In order to be able to keep the motor relatively small it is caused to rotate at high speed and that is stepped down by the use of a small drive output pinion and a large drive gear.

Although the known design functions satisfactorily, the invention provides that an intermediate transmission for reducing the rotary speed is arranged between the servomotor and the gears.

Initially it is not clear why that increased structural complication and expenditure should be more than offset by an overall improved function of the entire apparatus. With the same number of revolutions of the servomotor and the spindles, the arrangement in accordance with the invention firstly reduces the speed of the toothed belt according to the transmission ratio of the intermediate transmission. That provides that the installation is substantially quieter in operation. That advantage alone however would scarcely justify the increased structural complication and expenditure, especially as the intermediate transmission provided contributes more to the moving mass than is saved by the reduction in the size of the gears which are carried on the spindles. Nonetheless the novel construction contributes to making the injection procedure more easily controllable as it has been found that it is not the inertia of the axially moved masses alone but to a substantial extent the mass moments of inertia of the rotating components of the machine that are responsible for that. Ultimately therefore the invention even makes it possible to use a smaller but faster running servomotor with nonetheless substantially improved control of the operating procedure involved.

Figure 3:
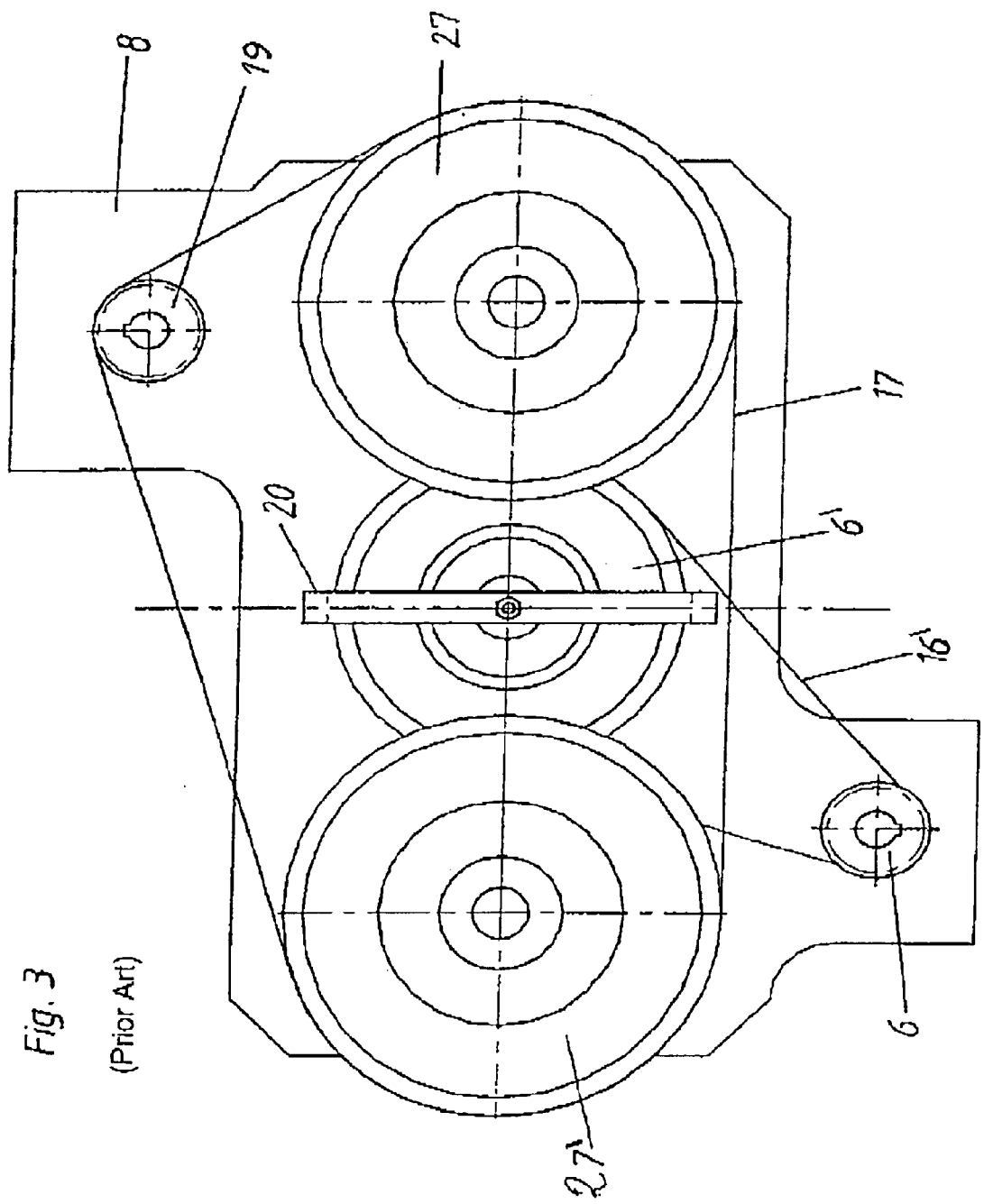
Figure 5:
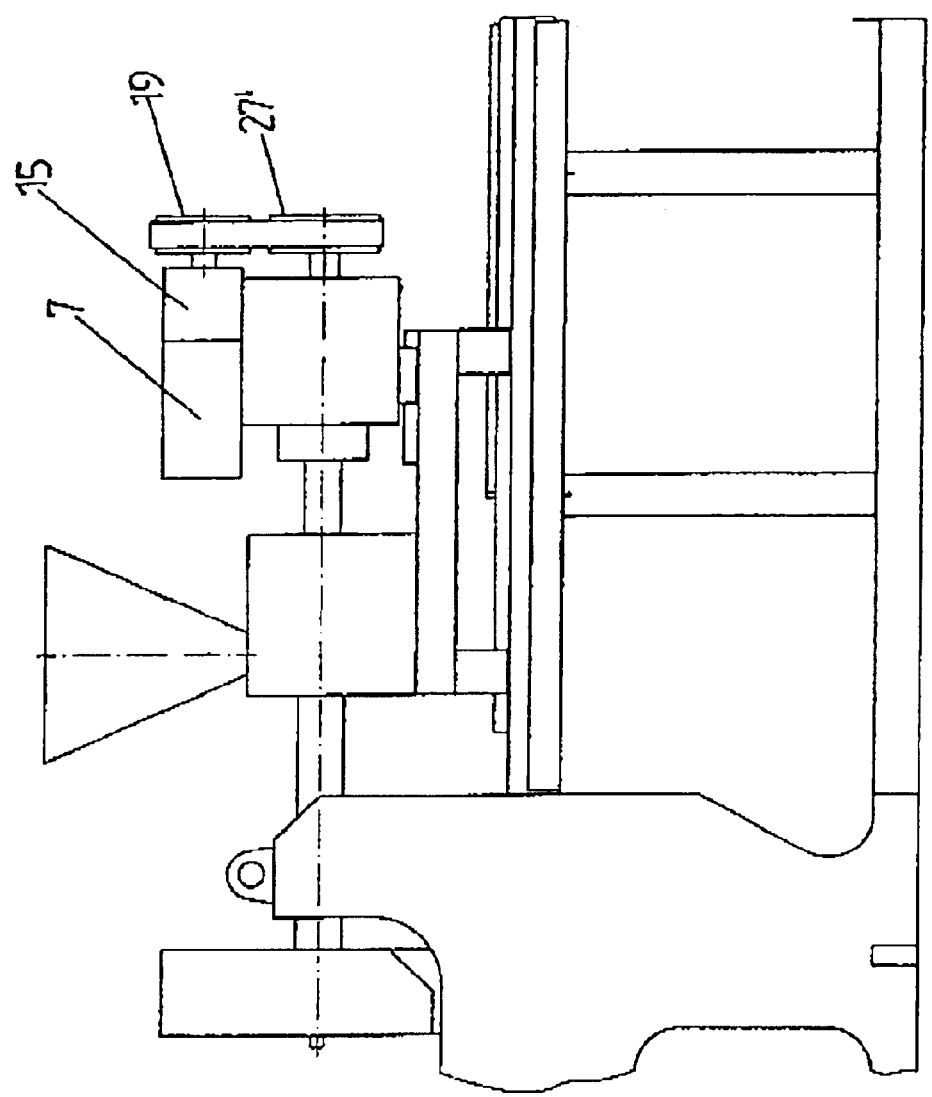
Figure 4:
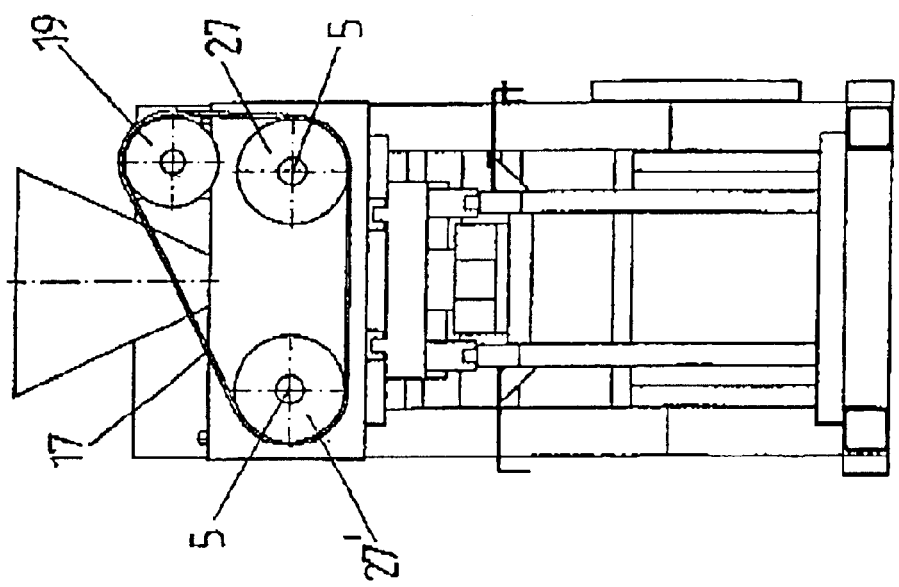
Figure 6:
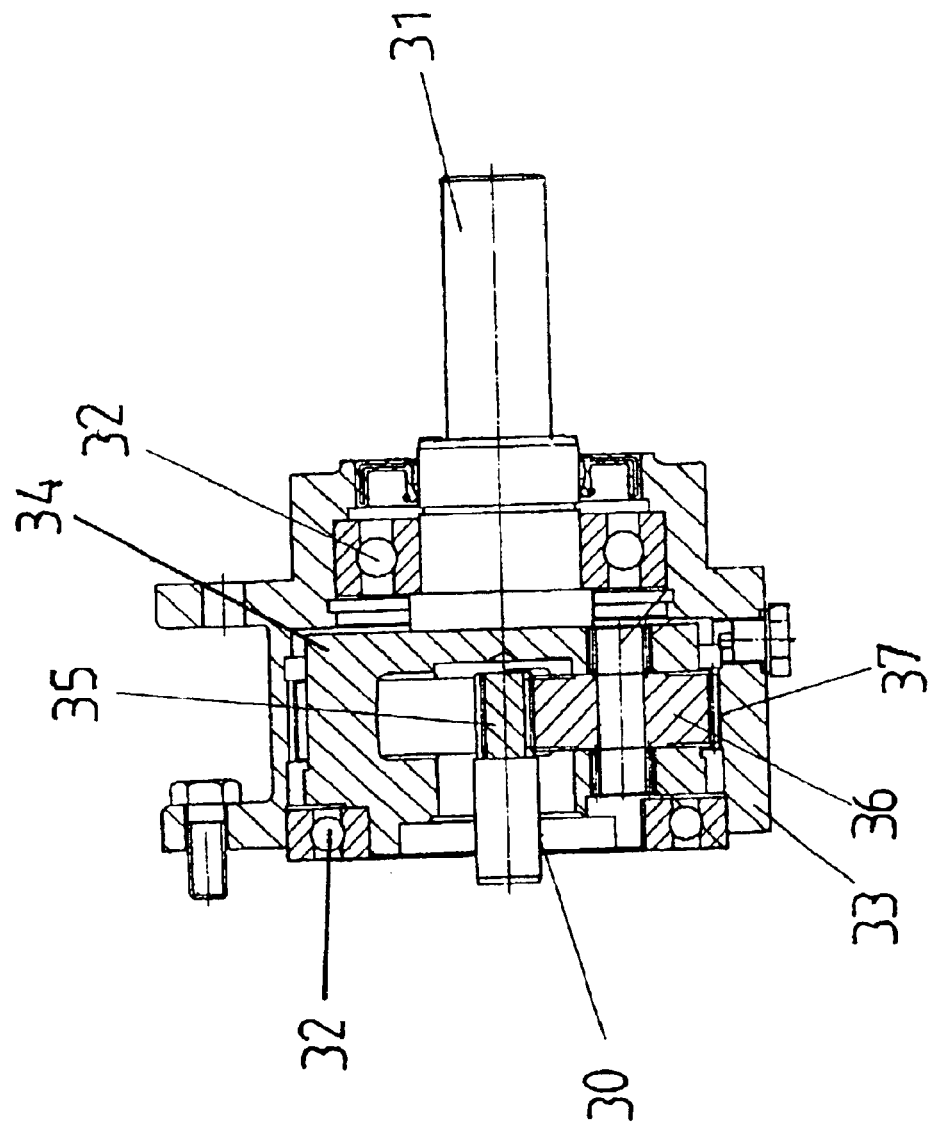

Details of the invention are described hereinafter with reference to the drawing in which FIGS. 1 to 3 relate to the state of the art, FIGS. 4 and 5 are a rear view and a side view respectively of the apparatus improved in accordance with the invention and FIG. 6 is a view of the intermediate transmission of FIG. 5.

Figure 1:
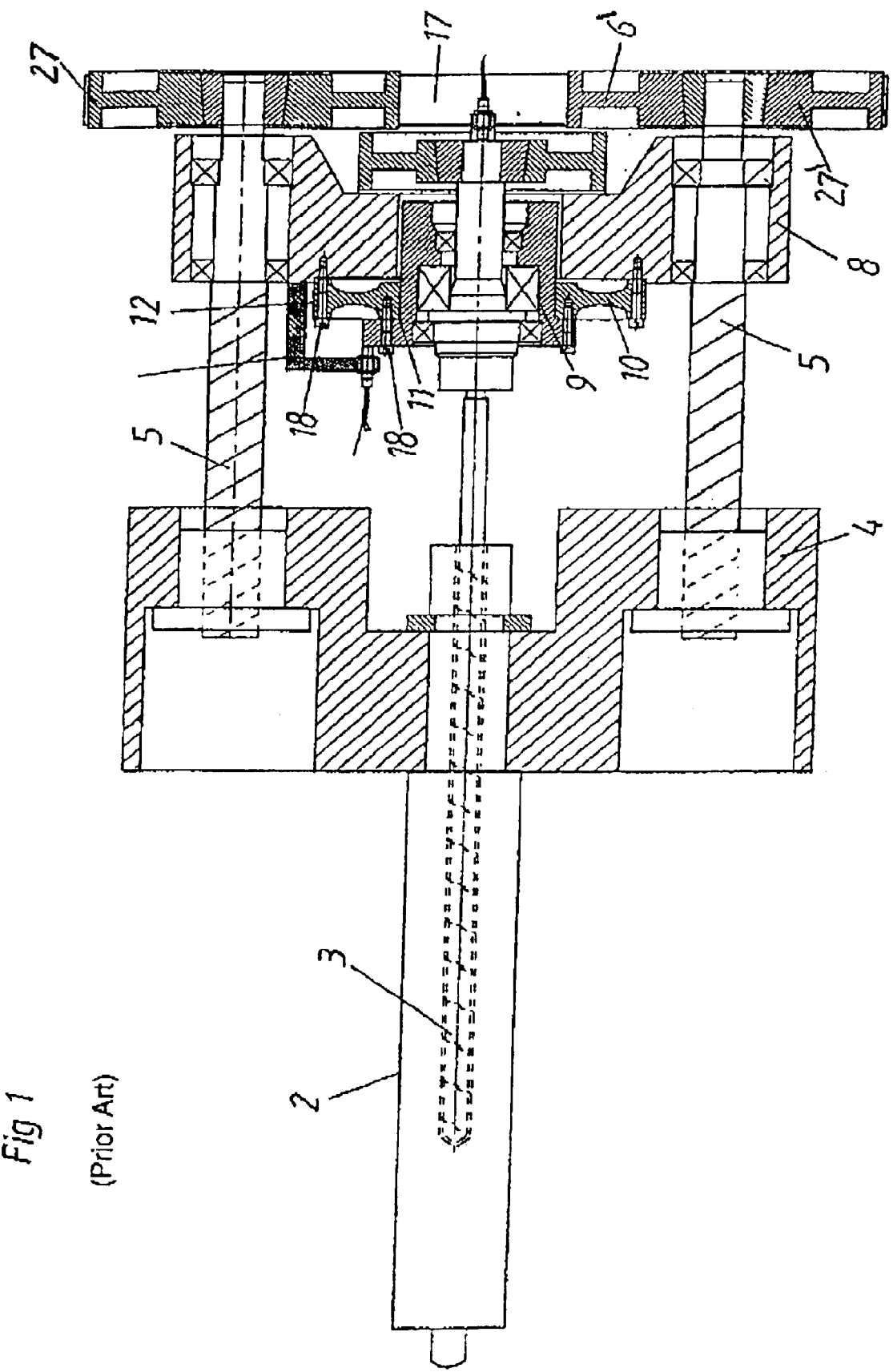
Figure 2:
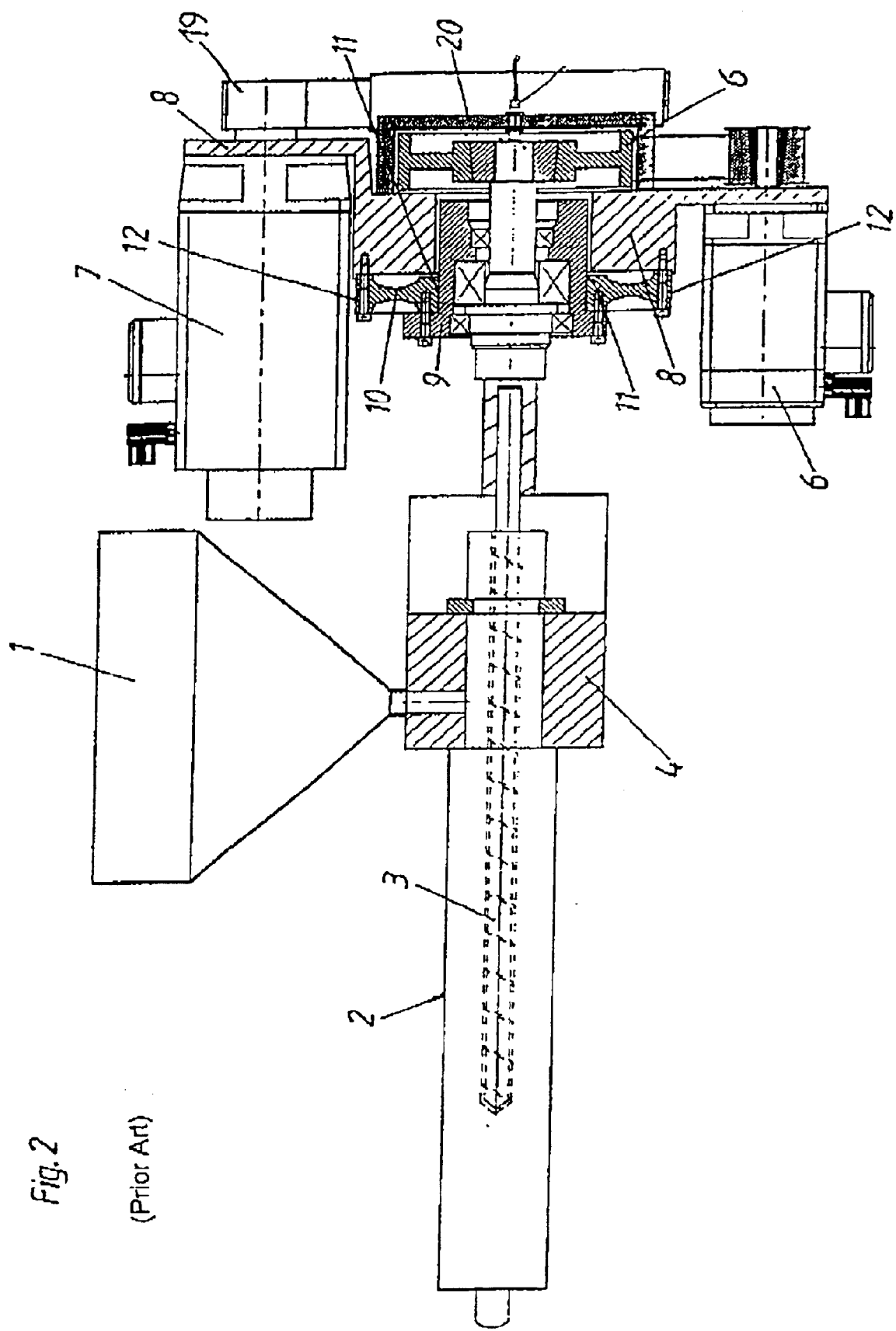

The injection apparatus illustrated in FIGS. 1 to 3 is known as such and therefore does not have to be described in detail. It has a screw 3 which is rotatably and longitudinally slidably mounted in a mass cylinder 2. Plastic material supplied through the hopper 1 to the screw 3 is plasticised by the rotation of the screw 3 and collected in the screw ante-chamber until it is injected into the mould cavity (not shown) by forward displacement of the screw 3. During the plastic material metering and injection procedure the carrier plate 4 which is connected to the mass cylinder 2 remains immobile. The end of the screw 3 is supported in a pressure plate 8 against which the screw 3 bears. The pressure plate 8 in turn is supported in the carrier plate 4 by way of spindles 5. The drive for the spindles 5 is effected by way of the V-belt 17 and the drive pulleys 27, 27' by means of a servomotor 7 which also performs the movement of the pressure plate 8. Also connected to the pressure plate 8 is the metering drive 6 which rotates the screw 3 and which drives the drive pulley 6' by way of the V-belt 16.

The end of the screw 3 is supported in a rotary bearing which does not interest us in greater detail here and which is surrounded by a stationary sleeve 9. The sleeve 9 and the pressure plate 8 are connected by an annular disc 10. Its inner edge 11 is connected to the sleeve 9 and its outer edge 12 to the pressure plate 8 by screws 18.

In the injection procedure the pressure plate 8 is moved towards the left by means of the motor 7 by way of the spindles 5. For that purpose the motor 7 has to initially accelerate a plurality of moved masses and then decelerate them again, so that the control performance is substantially influenced thereby. An apparatus in which this is improved is shown by the embodiment of the invention as illustrated in FIGS. 4 to 6.

As can be seen from FIG. 5, an intermediate transmission 15 is now connected between the servomotor 7 and the pinion 19, the intermediate transmission 15 reducing the speed of rotation of the pinion 19 with respect to that of the motor 7. This means that there is no longer any need for a substantial change in the rotary speed between the pinion 19 and the gears 27. The diameter of the pinion 19 can be increased in comparison with the state of the art and—what is more important—the diameter of the gears 27, 27' and thus their mass moment of inertia can be reduced. The reduction in the diameter of the gears 27, 27', with the same rotary speed of the spindles 5, affords a reduction in the speed of the toothed belt 17 and thus a decisive reduction in noise.

The designer has a great deal of liberty in terms of the design of the intermediate transmission 15. For example it is possible to use a spur gear transmission or a planetary transmission which typically steps down the rotary speed in the ratio of 5:1. FIG. 6 shows a planetary transmission whose input shaft 30 is to be connected to the servomotor 7 and whose drive output shaft 31 is to be connected to the gear 19. The housing 33 of the transmission is fixed and is provided with an internal tooth arrangement 37. A cylindrical cage 34 provided with planet wheels 36 runs on bearings 32 in the housing 33. The planet wheels 36 are driven by the servomotor by way of the shaft 30 and the pinion 35 so that the cage 34 and therewith the shaft 31 rotate more slowly than the shaft 30.

What is claimed is:

1. A plasticising and injecting apparatus for plastic material comprising:
   a servomotor that rotates a pulley;
   gears connected by a tooth belt that are rotated by said pulley;
   spindles rotated by said gears, for axially displacing a rotatable screw arranged in a cylinder; and
   intermediate transmission (15) means for reducing spindle rotary speed, arranged between the servomotor (7) and the gears (27,27').

2. Apparatus according to claim 1, wherein the intermediate transmission (15) means is a planetary transmission.

* * * * *